(12) United States Patent
Hopper et al.

(10) Patent No.: US 7,453,633 B2
(45) Date of Patent: Nov. 18, 2008

(54) PERFORATE PROJECTION SCREEN WITH INCONSPICUOUS SEAMS

(75) Inventors: Clayton L Hopper, Canal Fulton, OH (US); Kevin P McGrew, Canal Fulton, OH (US)

(73) Assignee: Astro-Tec Manufacturing, Inc, Canal Fulton, OH (US)

( * ) Notice: Subject to any disclaimer, the term of this patent is extended or adjusted under 35 U.S.C. 154(b) by 340 days.

(21) Appl. No.: 11/143,029

(22) Filed: Jun. 2, 2005

(65) Prior Publication Data
US 2006/0274413 A1 Dec. 7, 2006

(51) Int. Cl.
G03B 21/56 (2006.01)
G03B 21/60 (2006.01)
E04B 7/08 (2006.01)

(52) U.S. Cl. .............. 359/451; 359/459; 359/443; 52/81.1

(58) Field of Classification Search ........... 359/451, 359/450, 459, 443; 52/81.1
See application file for complete search history.

(56) References Cited

U.S. PATENT DOCUMENTS

| | | | |
|---|---|---|---|
| 2,238,365 A | 4/1941 | Hurley | |
| 2,366,761 A | 1/1945 | Walker | |
| 2,699,090 A | 1/1955 | Underhill, Jr. | |
| 3,260,156 A | 7/1966 | Komitor | |
| 3,632,185 A | 1/1972 | Meanor | |
| 3,992,841 A | 11/1976 | Ward, Jr. | |
| 4,057,323 A | 11/1977 | Ward, Jr. | |
| 4,750,807 A | 6/1988 | Chamayou dit Felix | |
| 5,011,263 A * | 4/1991 | Hopper | 359/451 |
| 5,724,775 A * | 3/1998 | Zobel et al. | 52/82 |

FOREIGN PATENT DOCUMENTS

JP 04133043 A * 5/1992

* cited by examiner

Primary Examiner—Diane I. Lee
Assistant Examiner—Magda Cruz
(74) Attorney, Agent, or Firm—Paul E Milliken; Ray L Weber

(57) ABSTRACT

A perforate projection screen for movies, planetariums and the like having inconspicuous seams and uniform reflectivity throughout its visible surface. The screen is made from a plurality of perforate panels and is mounted, when in use, with a dark non-reflective chamber behind the screen. Any overlapped areas of the panels and any frame members or other objects, in close proximity to the back of the panels are covered with a black velour type material to prevent light reflection from panel holes where objects are in close proximity to the back of the panel. The edges of adjacent panels overlap to form seams with the overlapped edges of the panels being crimped to form recesses to receive the overlapping edge strip of an adjacent panel, thereby hiding the overlapping panel edge to reduce shadow lines and make the panel edges inconspicuous to viewers.

18 Claims, 5 Drawing Sheets

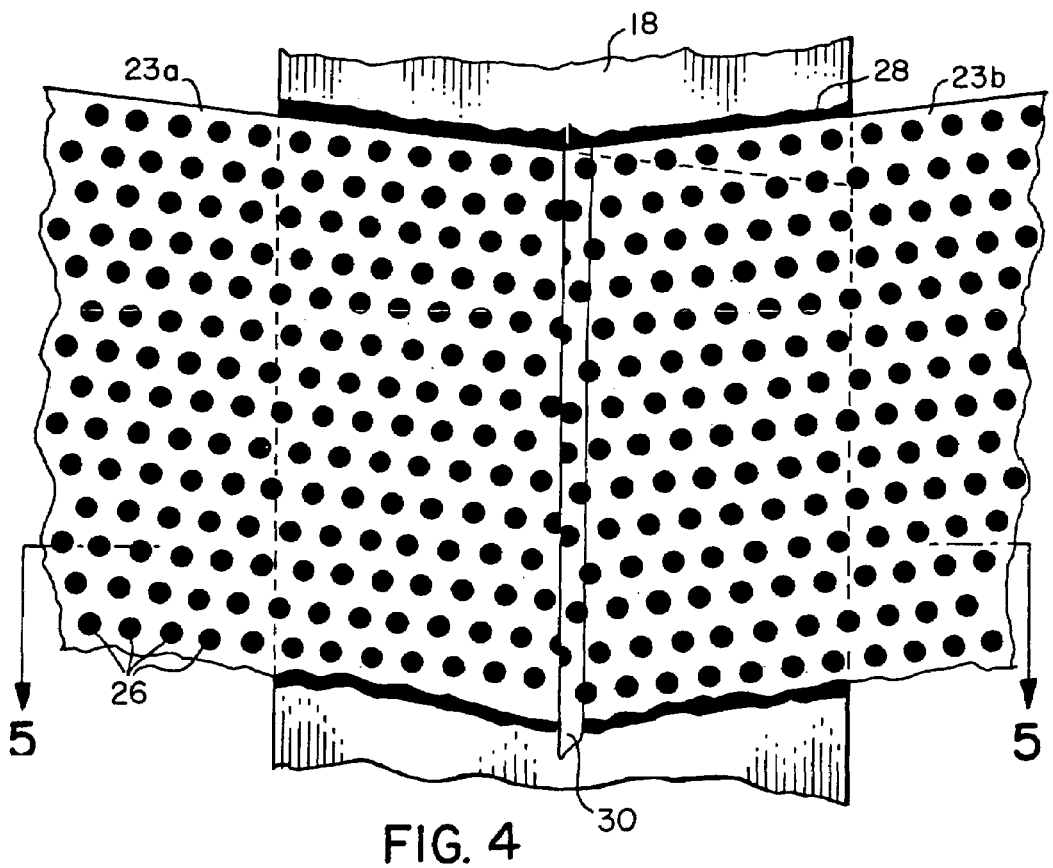
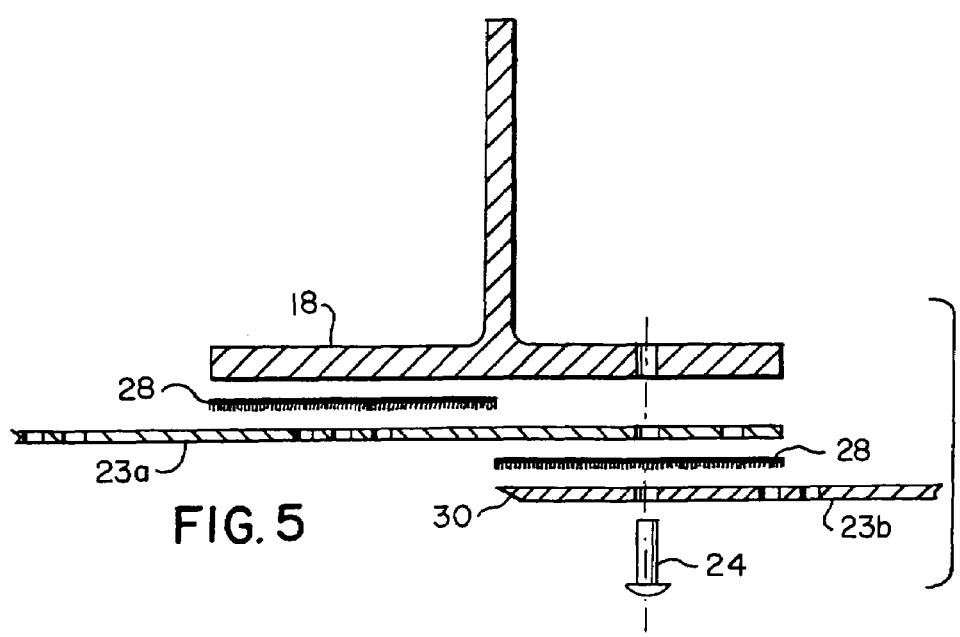

PERFORATE PROJECTION SCREEN WITH INCONSPICUOUS SEAMS

FIELD OF THE INVENTION

This invention relates to a perforate projection screen having inconspicuous seams and substantially uniform reflectivity throughout its visible surface which may be used in applications such as a motion picture screen or a planetarium.

BACKGROUND OF THE INVENTION

The use of perforate projection screens is well known in the prior art as shown and described in U.S. Pat. No. 2,366,761 issued to R O Walker, U.S. Pat. No. 3,992,841 issued to R Ward, Jr and U.S. Pat. No. 4,750,807 issued to G Chamayou dit Felix.

Perforate screens are particularly useful as spherical or geodesic dome shaped screens used in planetariums to permit the flow of heating and cooling air through the screen to the inside of the domed screen from the space between the screen and the exterior dome of the planetarium thereby assuring the proper ventilation and temperature is maintained inside the domed screen and the viewing area of the planetarium.

One of the problems encountered when using a perforate screen is that when lap joints are used to connect adjacent perforate panels of the screen, the holes in overlapping edges of the adjacent panels are not always in alignment with each other and the surface of the overlapped panel sometimes shows through the holes in the overlapping panel edge thereby creating a strip of greater reflectivity than the rest of the surfaces of the panels where the holes are not blocked by the surface of an overlapped panel, or by a supporting frame member or some other object in close proximity to the back of the panel.

The prior art devices have attempted to eliminate these areas of greater reflectivity by applying black paint or black tape to the surface of any overlapped panel edges or frame members which would show through the holes in the overlapping perforate panels.

It has been found however, that even when black paint or tape is used to cover the overlapped surfaces there is still sufficient reflectivity from the black surfaces that the overlapped surfaces showing through the holes still create strips or areas of higher reflectivity than the rest of the screen. These strips or areas show up as light strips or other shapes on the screen and thereby break the desired continuity of the screen and distract from the images being projected on the screen. The problem of uniform reflectivity of the screen surface has been solved by my prior U.S. Pat. No. 5,011,263 (C L Hopper) which discloses and claims the use of dark material having vertically extending fibers on any surface which is overlapped by perforate sheets forming the projection screen surface.

In addition to the problem of non-uniform reflectivity described above, when the perforate patents are overlapped at interconnecting seams, a shadow is formed at the edge of the overlapped to panel which is visible when viewing the screen. This is most noticeable on the horizontal seams of the screen. Attempts have been made to solve this problem by beveling the edge of the overlapping panel to reduce the shadow appearing on the edge as may be seen in U.S. Pat. No. 3,992, 841 issued to R Ward Jr and my prior U.S. Pat. No. 5,011,263, however, it has been found that beveling the edge does not sufficiently eliminate the shadow and the seam can still be seen by viewers of the screen.

OBJECTS OF THE INVENTION

It is a primary object of this invention to provide a perforate projection screen utilizing a simple and inexpensive solution to the problem of non-uniform reflectivity in lap joint areas of the projection screen and in areas of the screen where frame members or other objects are located in contact with or in close proximity to the back side of the screen.

Another object of this invention is to provide a perforate projection screen having substantially uniform reflectivity throughout its visible surface without resorting to any structural changes in either the perforate panels or their supporting frame members. A still further object of this invention is to provide a perforate projection screen with no visible lines or other shapes on the viewing surface of the screen which distract from the images being projected thereon.

Still another object of the invention is to provide inconspicuous edge lines on a projection screen at overlapped seams caused by edge shadows on each top panel edge.

These and other objects of the invention will become more fully apparent in the following specification and the attached drawings.

SUMMARY OF THE INVENTION

This invention is a perforate projection screen with substantially uniform reflectivity throughout its visible surface comprising at least one perforate panel having a light reflective surface on one side thereof and a plurality of rows of holes therethrough located substantially throughout the entire reflective surface of each such panel, a plurality of edge portions extending around the panel, each such panel adapted to be mounted a spaced distance from a substantially non-reflective surface, thereby creating a substantially uniformly dark non-reflective chamber behind the panel, each panel being mounted with at least one of its edge portions overlapping an edge portion of the next adjacent panel to form a seam; and a dark material covering the surfaces of any objects which are in sufficiently close proximity to the back of the panel to be visible through the holes in the panel without such covering, said dark material having a textured surface comprised of a plurality of dark fibers extending vertically from the surface thereof to reduce the surface reflectivity of all such objects so that they are not visible through the holes in the panels, at least part of the overlapped edge portions of each overlapped panel being crimped to form an offset strip which is recessed from the rest of the light reflective surface of the panel a sufficient distance so that when each overlapped overlapping panel is placed in overlapping position with the offset overlapped strip, the light reflective surface of the overlapped panel and the overlapping panel are flush with each other and the edge of the overlapping panel is hidden by its position in the recess of the offset overlapped strip.

DESCRIPTION OF THE DRAWINGS

FIG. 4 is an enlarged fragmentary view similar to that shown in FIG. 2 but with dark material with vertically extending fibers positioned between the overlapping portions of the panels and between one of the panels and the supporting frame member;

FIG. 5 is an exploded cross-sectional view taken on line 5-5 of FIG. 4;

DESCRIPTION OF THE PREFERRED EMBODIMENTS

Figure 1:
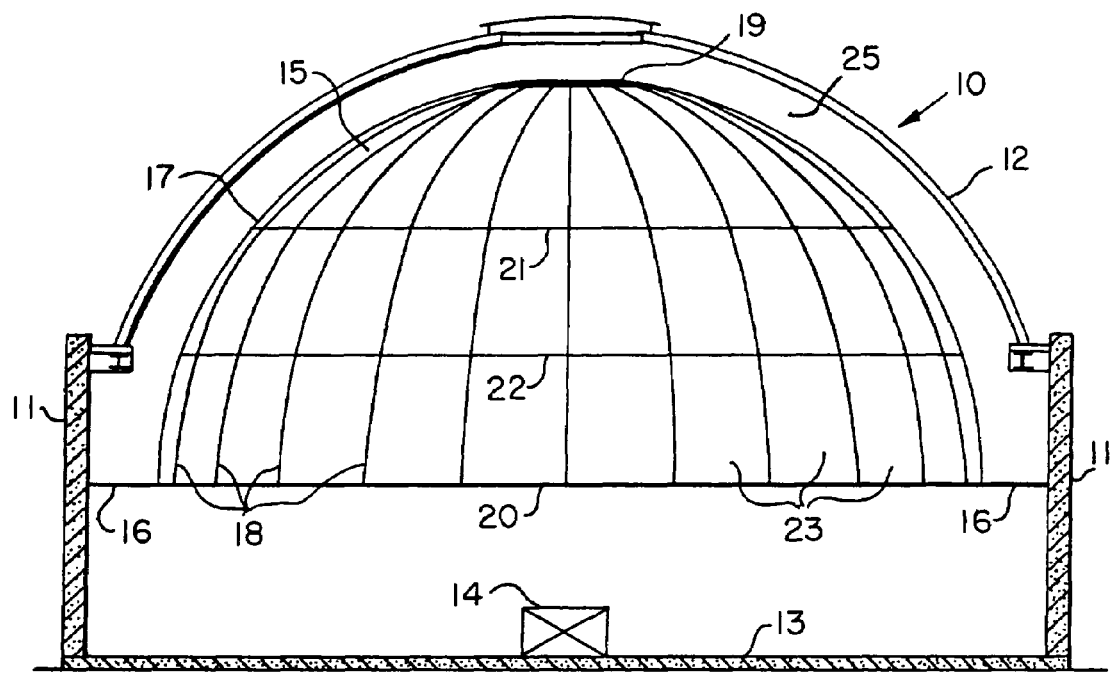
FIG. 1 is a side elevational view of a planetarium with portions of the walls and outer dome broken away to show the dome shaped perforate projection screen.

Referring now to the drawings and in particular to FIG. 1, a planetarium indicated generally by the numeral 10 has vertical side walls 11 with a spherical shaped exterior dome 12 mounted thereon. A floor 13 extends between the side walls 11 and has a projection area 14 near the center thereof. A perforate screen 15 in the shape of a geodesic dome or hemisphere is attached to the side walls 11 by suitable connecting frame members 16. The screen 15 is supported by a hemispherical frame assembly 17 consisting of a plurality of arcuate frame members 18 extending radially outwardly and downwardly from a top ring 19 to a bottom ring 20. A pair of intermediate rings 21 and 22 are attached, by bolts and brackets or any other suitable means, to each of the frame members 18 between the top ring 19 and bottom ring 20. The rings 19, 20 21 and 22 all lie in parallel horizontal planes.

The frame members 18 and the rings 19 through 22 may be made of beams or tubing of aluminum or other suitable material.

Figure 3:
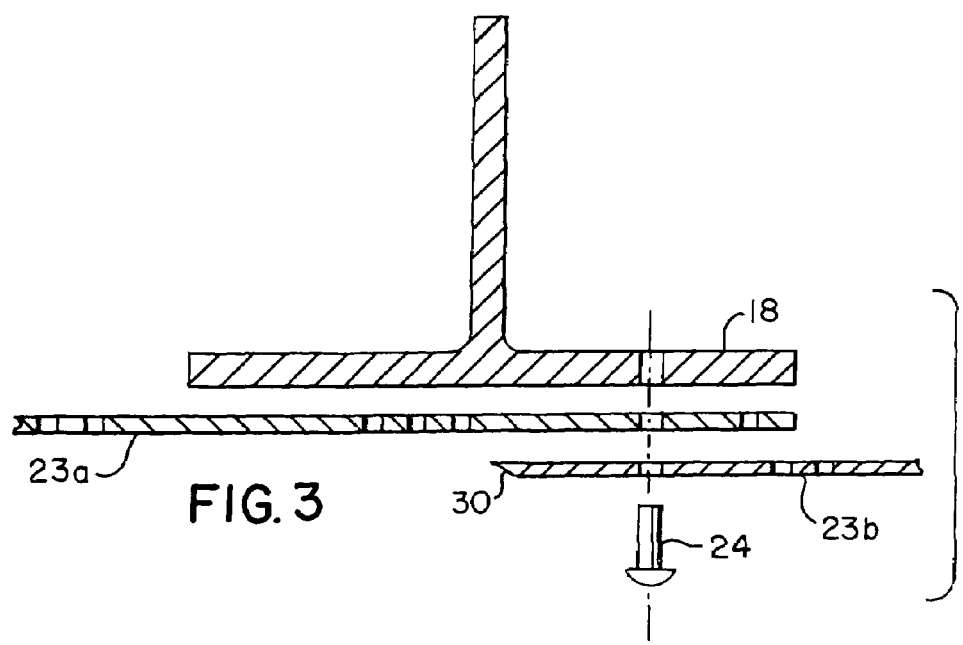
FIG. 3 is an exploded cross-sectional view taken on line 3-3 of FIG. 2.

A plurality of trapezoid-shaped perforate panels 23 of aluminum or other suitable material are attached to the inner surfaces of the frame members 18 and rings 19 through 22 by rivets 24 as shown in FIG. 3 or 5 or by other means. The panels 23 in the present example are made of 0.040" thick aluminum, however, other thicknesses and other materials may also be used for the panels depending upon the various design requirements of each particular screen.

When the assembled projection screen 15 is mounted inside the exterior dome 12 as shown in FIG. 1, the screen 15 and the dome 12 define a dark annular chamber 25 therebetween.

Figure 2:
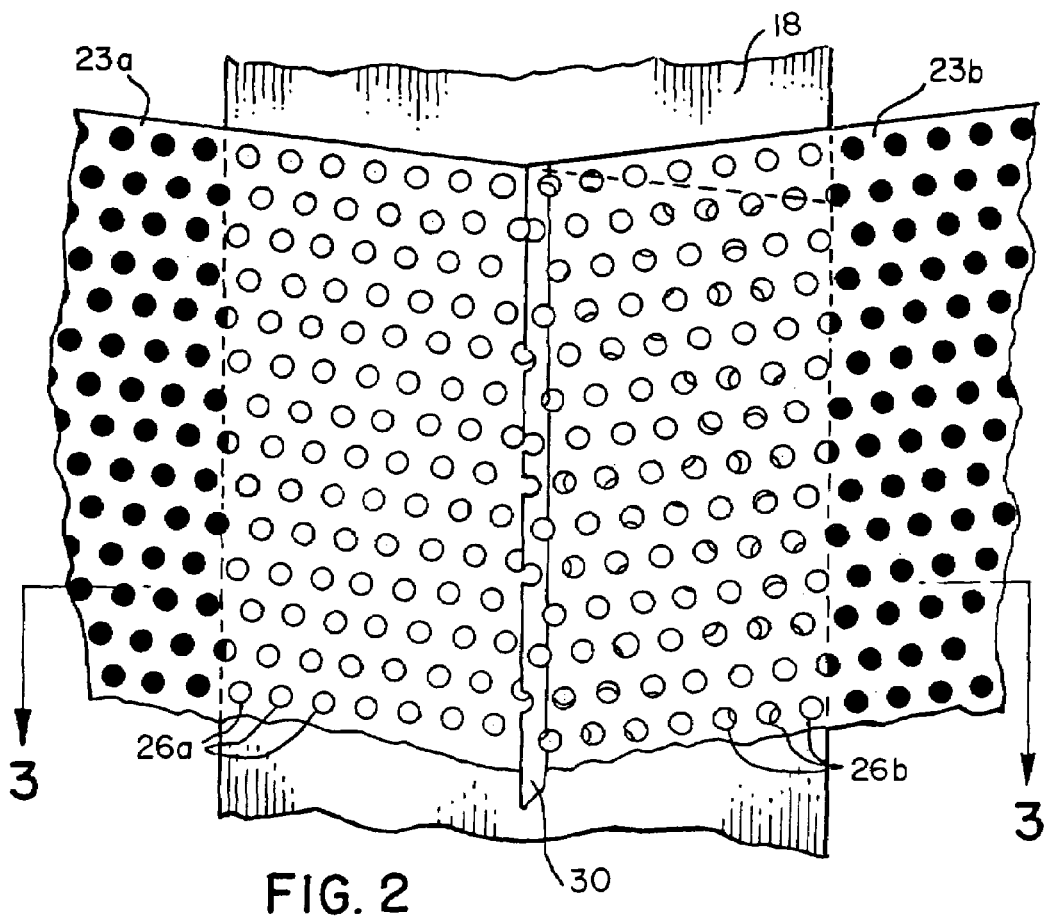
FIG. 2 is an enlarged fragmentary view of a portion of the perforate projection screen shown in FIG. 1 with an overlapped portion of one panel and a supporting frame member showing through the holes in the overlapping panel.

Depending upon the use of the projection screen and the amount of reflectivity needed, the inner or reflective surface of the screen 15 is coated or painted white or some shade of gray. When the screen 15 is in position within the planetarium 10, the dark annular chamber 25 shows through the holes 26 in the panels 23 as a plurality of small black dots as shown in FIG. 2. At a viewing distance from the screen, due to the small size of the holes, (1/16" dia. on 1/8" staggered centers) the dark holes and the light color of the reflective surface of the screen visually merge together like a half-tone photograph to give the appearance of a shade of light gray when a light is projected upon the screen.

Referring again to FIG. 2 and also to FIG. 3, there is shown a lap joint of two adjacent panels 23a and 23b with panel 23a being overlapped by 23b and both panels riveted to the frame member 18 by rivets such as 24. When the panels 23a and 23b are assembled on the frame member 18 in this manner it may be seen from FIG. 2 that the overlapped edge of panel 23a shows through the holes 26b in the panel 23b. The surface of the frame member 18 also shows through the holes 26a in the panel 23a and through part of the holes in both panels 23a and 23b which happen to be in alignment with each other. It may also be seen from FIG. 2 that the reflected light from the reflective surfaces of the frame member 18 and the panel 23a which show through the holes 26a and 26b creates a strip of greater reflectivity in the area of the lap-joint and the frame member 18 than in the remaining surface of the panels where the holes 26 are in communication with the dark chamber 25. This results in a lighter strip appearing in all the lap-joints and in front of all the frame members 18 and the rings 19 through 22 or in any other area where a reflective object is in close proximity to the back of any of the panels 23.

Figures 6, 7:
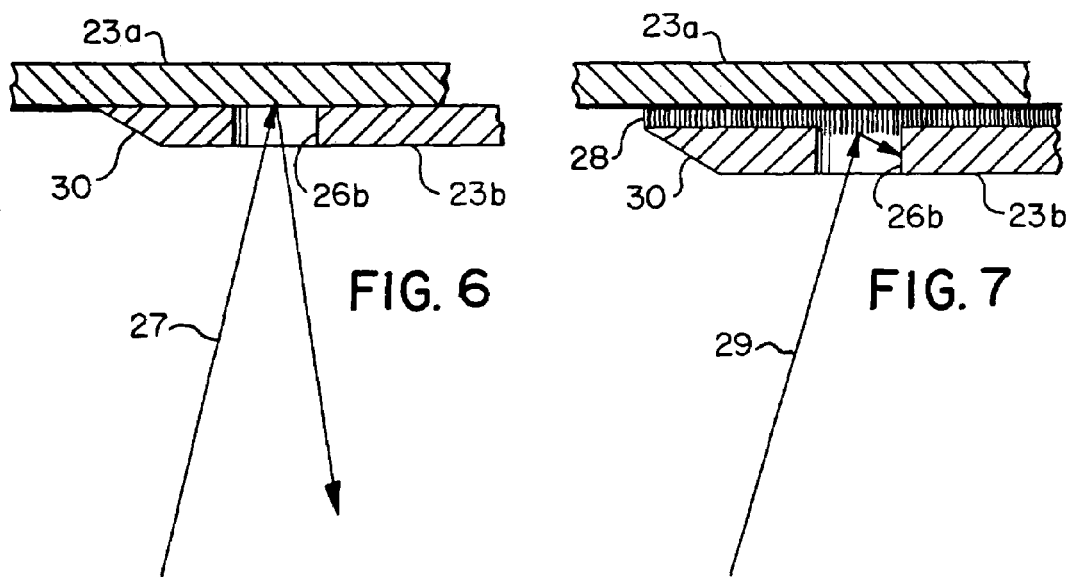
FIG. 6 is a greatly enlarged cross-sectional view of a portion of the panels shown in FIGS. 2 and 3 showing the reflection of light from the overlapped panel.
FIG. 7 is a greatly enlarged cross-sectional view of a portion of the panels shown in FIGS. 4 and 5 showing the reduction in reflectivity caused by positioning a dark sheet of material with vertically extending fibers between the overlapped portion of the two adjacent panels.

FIG. 6 illustrates how the light ray 27 passes through the hole 26b in the panel 23b and bounces off the reflective surface of the panel 23a. It has been found that even when the overlapped portion of the panel 23a or a frame member 18 is painted black or covered with plain black tape there is still sufficient reflectivity from the black paint or tape that a light strip or area will be visible on the screen 15.

FIGS. 4 and 5, shows an assembly similar to that shown in FIGS. 2 and 3 except that a strip preferably of black velour type material 28 having vertically extending fibers is attached to cover the reflective surfaces of the frame member 18 and the overlapped portion of the panel 23a. The vertically extending fibers of the material 28 either absorb any projected light rays or deflect them at a low angle as shown in FIG. 7 where the light ray 29 passes through the hole 26b and is trapped within the hole and thereby gives the visual impression shown in FIG. 4 where all the holes covered by the strip of dark velour material 28 have the same dark visual appearance as the holes 26 in communication with the dark chamber.

Thus it can be seen that the entire visible surface of the screen 15 can be made to provide uniform reflectivity by inserting the velour type material 28 to cover all overlapped joints and all frame members or other objects in close proximity to the back of the perforate screen 15.

It should be understood that the black velour type material can be used on curved, spherical shaped or flat projection screens to provide uniform reflectivity and eliminate light lines or other shapes on the visible surface of the screen.

As a further means of making edge shadow lines inconspicuous on the visible surface of the screen 15, the edge 30 of the overlapping panel 23b is beveled as shown in FIGS. 3, 5, 6 and 7. The beveled edge 30 is then painted or coated the same color as the rest of the reflective surface of the screen 15.

Figure 8:
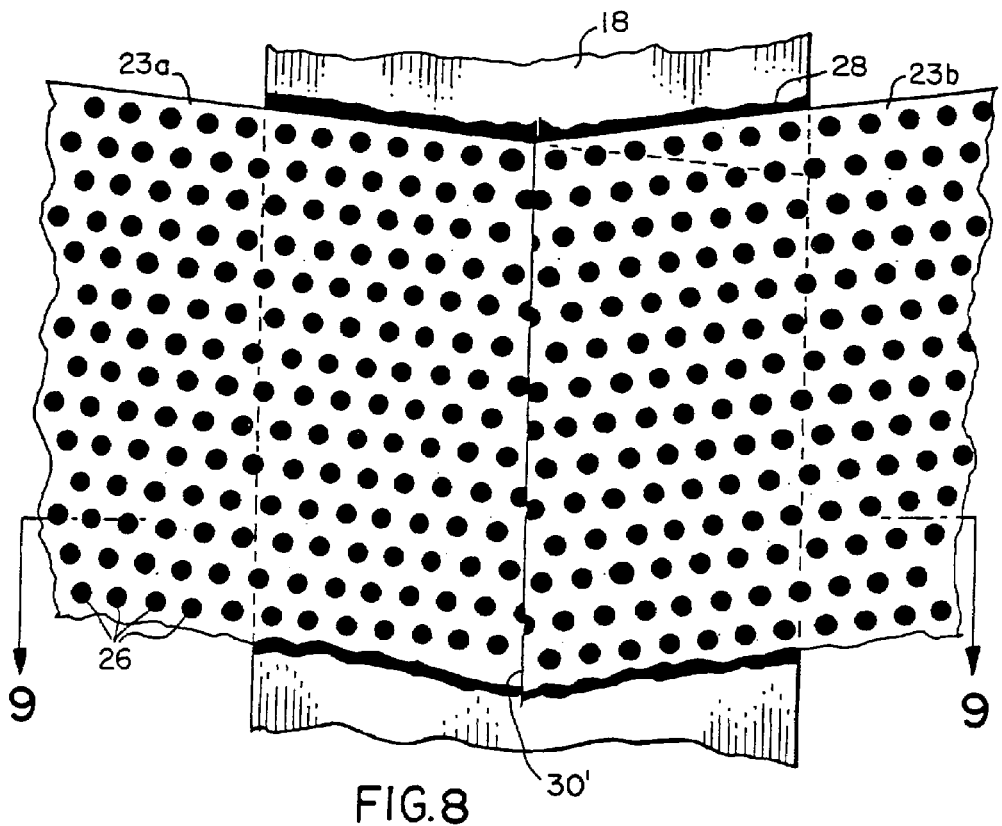
FIG. 8 is an enlarged fragmentary view similar to that shown in FIG. 4 but showing an offset overlapped strip which is recessed from the rest of the light reflective surface of the panel to receive and hid the overlapped edge of the top panel.
Figure 9:
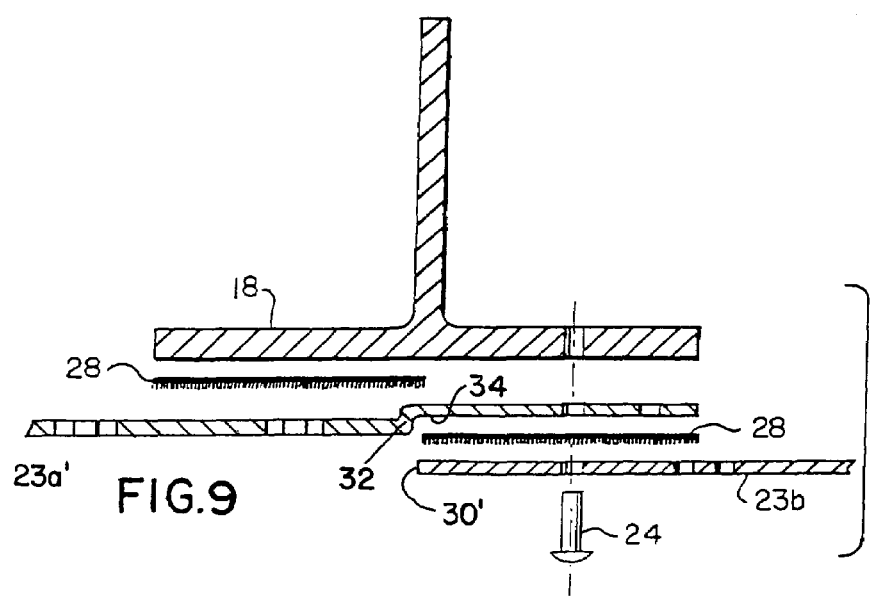
FIG. 9 is an exploded cross-sectional view taken on line 9-9 of FIG. 8.
Figure 10:
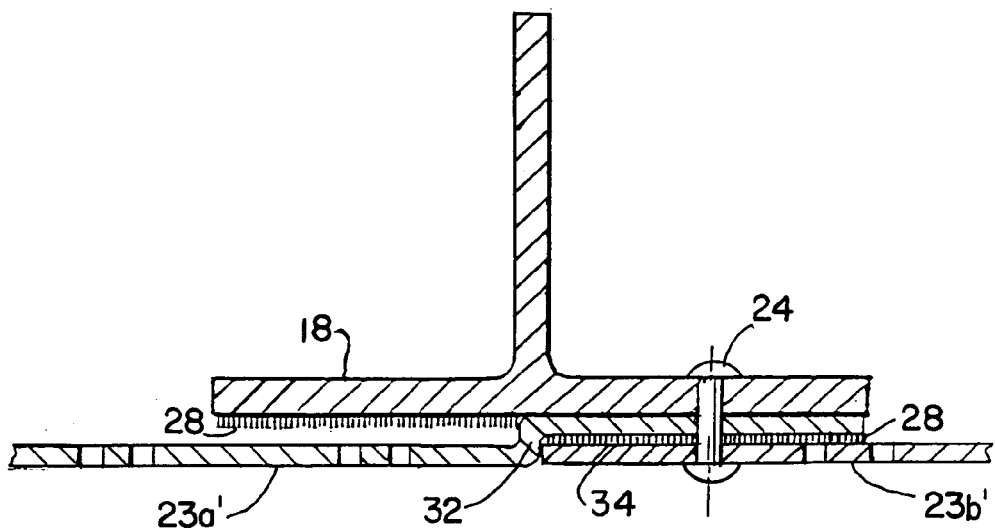
FIG. 10 is a cross-sectional view showing the parts of the exploded view in FIG. 9 after the parts are assembled together.

An even more effective means of making edge lines or shadows inconspicuous on the visible surface of the screen 15 is shown in FIGS. 8-10 wherein the panel 21a' has a crimped portion 32 which creates a recessed strip 34 along one edge with the depth of the recess being equal to the thickness of the dark material 28 and the panel 23b'. thereby causing the surface of the panels 23a' and 23b' to be in alignment when the panel 23b' is placed in an overlapping position with the recess 34 and with the edge 30' being hidden by the crimped portion 32 and thereby making a shadow on the edge 30' inconspicuous from the perspective viewpoint of the seated viewer of the screen.

FIG. 10 shows the exploded parts of FIG. 9 in the assembled position and further illustrates how the edge 30 is hidden when the panels 23a' and 23b' are assembled together in the overlapped position.

The overlapped panel seams shown in FIGS. 8-10 can be used on either the vertical seams or the horizontal seams, however they are more important for use on the horizontal seams since that is where the shadow lines on the panel edges are most visible under certain projector light locations.

It should be noted that in order to compensate for the recess 34, the vertical beams 18 or the horizontal beams 20-21 may be adjusted on their radii in order to assure that the inside surface of the screen 15 maintains a spherical shape throughout the entire screen.

Figure 11:
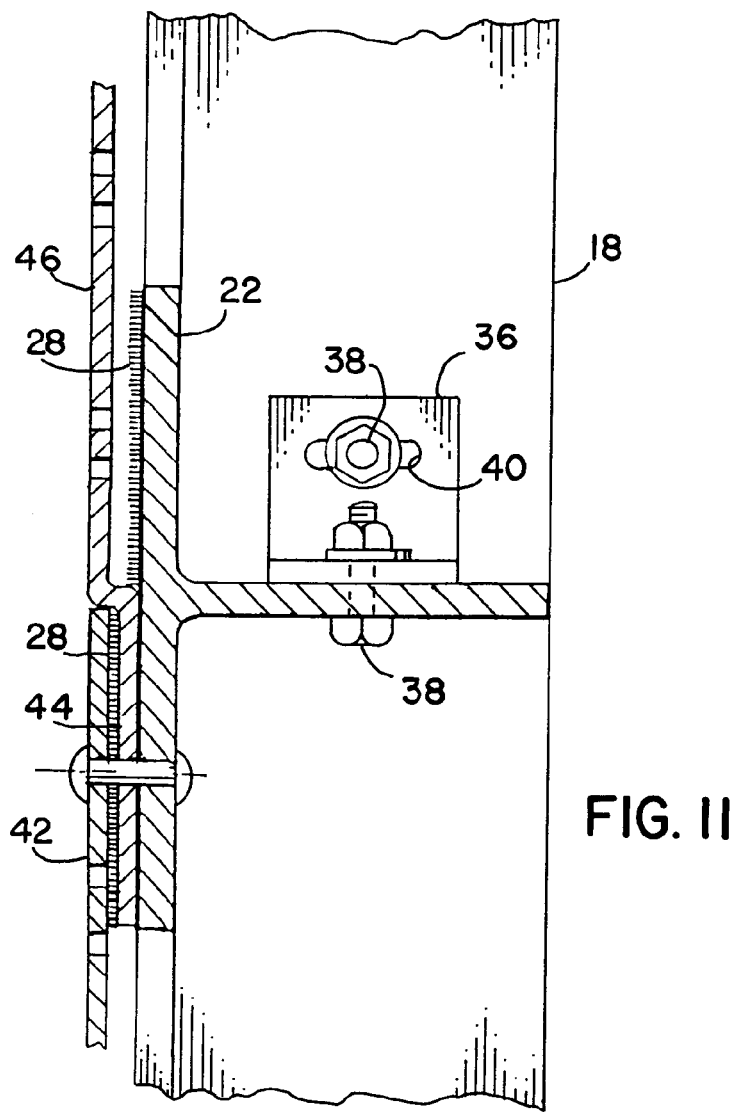
FIG. 11 is a fragmentary view showing the intersection of the vertical beams and horizontal rings of a planetarium framework.

The vertical curved beams 18 and horizontal rings 19-22 are attached to each other at their intersecting portions by angular clips 36 as shown in FIG. 11 which are bolted to both the vertical beams 18 and horizontal rings 19-22 by bolts 38 extending through slotted holes 40 which provide for adjustment of the radii of the beams and rings as previously described above. The holes in both the clips and the rings and beams may be slotted if desired.

In FIG. 11 a horizontally extending seam is formed by a panel 42 overlapping a recess 44 of a panel 46. It can be seen that the overlapped arrangement of the panels 42 and 46 is similar to that of the panels 23a' and 23b' in FIGS. 8-10 and the dark material 28 is positioned in the same manner as previously described in the vertical seams.

These and various other modifications can be made herein without departing from the scope of the invention.

We claim:

1. A perforate projection screen with substantially uniform reflectivity throughout its visible surface comprising:
   (A) a plurality of perforate panels assembled together, each panel having;
       (1) a light reflective surface on one side thereof,
       (2) a plurality of rows of holes therethrough located substantially throughout the entire reflective surface of each panel, and
       (3) a plurality of edge portions extending around the panel;
   (B) each panel adapted to be mounted a spaced distance from a substantially non-reflective surface, thereby creating a substantially uniformly dark non-reflective chamber behind the panel;
   (C) each panel being mounted with at least one of its edge portions overlapping an edge portion of the next adjacent panel to form a seam; and
   (D) a dark material covering the surfaces of any objects which are in sufficiently close proximity to the back of the panel to be visible through the holes in the panel without such covering, said dark material having a textured surface comprised of a plurality of dark fibers extending vertically from the surface thereof to reduce the surface reflectivity of all such objects so that they are not visible through the holes in the panel;
   (E) at least part of the overlapped edge portions of each overlapped panel being crimped to form an offset overlapped strip which is recessed from the rest of the light reflective surface of the panel a sufficient distance so that when each overlapping panel is place in overlapping position with the offset overlapped strip, the light reflective surface of the overlapped panel and the overlapping panel are flush with each other and the edge of the overlapping panel is hidden by its position in the recess of the offset overlapped strip.

2. The perforate projection screen as claimed in claim 1 wherein at least one of the objects covered by the dark material is an offset overlapped strip of a perforate panel.

3. The perforate projection screen as claimed in claim 1 wherein only horizontal seams of the projection screen have crimped overlapped edge portions.

4. The perforate projection screen as claimed in claim 1 wherein all seams of the projection screen have crimped overlapped edge portions.

5. The perforate projection screen as claimed in claim 1 wherein the object covered by the dark material is a supporting frame member attached to the back surface of the panel.

6. The perforate projection screen as claimed in claim 5 wherein any frame member which contacts the back of any of the offset overlapped strips is adjusted in position to take into account the difference in thickness of the overlapped edge portions so that the reflective surface of the projection screen will be maintained in a true spherical shape throughout it entire surface.

7. The perforate projection screen as claimed in claim 1 wherein the dark material is black velour.

8. The perforate projection screen as claimed in claim 1 wherein the vertically extending fibers of the dark material extend into the holes of the perforate panel in the portion of the panel which lies in front of the object covered by the dark material.

9. The perforate projection screen as claimed in claim 1 wherein the dark material covers both overlapped portions forming seams between adjacent panels and supporting frame members attached to the back of the panels.

10. The perforate projection screen as claimed in claim 1 wherein the screen is in the shape of a portion of a sphere.

11. A perforate projection screen with substantially uniform reflectivity throughout its visible surface comprising:
    (A) a plurality of perforate panels assembled together, each panel having;
        (1) a light reflective surface on one side thereof,
        (2) a plurality of rows of holes therethrough located substantially throughout the entire reflective surface of each panel, and
        (3) a plurality of edge portions extending around the panel;
    (B) each panel being mounted in a working environment wherein a substantially uniformly dark non-reflective space is located behind the panel in such manner that when light is projected upon the screen, light is reflected only from the reflective surface of the panel and there is substantially no light reflected through the holes from the dark space behind the panel;
    (C) each panel being mounted with at least one of its edge portions overlapping an edge of the next adjacent panel to form a seam; and
    (D) a strip of dark material located between the overlapped edges of each panel and covering each overlapped edge portion in such manner that no part of the reflective surface of the overlapped edge portion is visible through the holes in the overlapping panel, said strip of dark material having a textured surface comprised of a plurality of dark fibers extending vertically from the surface thereof to reduce the reflectivity in the area within the holes in the overlapping edge portion to provide the same visual appearance of the screen surface in the area of the overlapped edge portions as in all the other portions of the screen;

(E) at least part of the overlapped edge portions of each overlapped panel being crimped to form an offset overlapped strip which is recessed from the rest of the light reflective surface of the panel a sufficient distance so that when each overlapping panel is place in overlapping position with the offset overlapped strip, the light reflective surface of the overlapped panel and the overlapping panel are flush with each other and the edge of the overlapping panel is hidden by its position in the recess of the offset overlapped strip.

12. The perforate projection screen as claimed in claim 11 wherein the dark material is black velour.

13. The perforate projection screen as claimed in claim 11 wherein the vertically extending fibers of the dark material extend into the holes of the perforate panel in the portion of the panel which lies in front of the object covered by the dark material.

14. The perforate projection screen as claimed in claim 11 wherein in addition to covering the overlapped edges of each panel the dark material also covers any frame members or other objects in close proximity to the back of the screen.

15. The perforate projection screen as claimed in claim 11 wherein the screen is mounted on frame members forming a dome shaped frame which support the screen in the shape of a portion of a sphere.

16. The perforate projection screen as claimed in claim 15 wherein any frame member which contacts the back of any of the offset overlapped strips is adjusted in position to take into account the difference in thickness of the overlapped edge portions so that the reflective surface of the projection screen will be maintained in a true spherical shape throughout it entire surface.

17. The perforate projection screen as claimed in claim 11 wherein only horizontal seams of the projection screen have crimped overlapped edge portions.

18. The perforate projection screen as claimed in claim 11 wherein all seams of the projection screen have crimped overlapped edge portions.

* * * * *